J. RADDIN.

Hub for Carriage-Wheels.

No. 8,108. Reissued Feb. 26, 1878.

WITNESSES:

Jas. E. Hutchinson

Henry C. Hazard

INVENTOR:

John Raddin, by

Prindle and Co. his Attys

N. PETERS, PHOTO-LITHOGRAPHER, WASHINGTON, D. C.

UNITED STATES PATENT OFFICE.

JOHN RADDIN, OF LYNN, MASSACHUSETTS.

IMPROVEMENT IN HUBS FOR CARRIAGE-WHEELS.

Specification forming part of Letters Patent No. 102,709, dated May 3, 1870; Reissue No. 8,108, dated February 26, 1878; application filed January 10, 1878.

*To all whom it may concern:*

Be it known that I, JOHN RADDIN, of Lynn, in the county of Essex and State of Massachusetts, did invent certain new and useful Improvements in Hubs for Carriage-Wheels, for which Letters Patent No. 102,709 were issued to me upon the 3d day of May, 1870, which Letters Patent have been found defective, in that the claims do not cover and embrace all of the original invention, as set forth in the application filed in the Patent Office on the 4th day of February, 1870. Now, therefore, being desirous of reissuing said Letters Patent, I have prepared, and do hereby declare, the following to be a full, clear, and more exact description of the said invention, reference being had to the accompanying drawing, making a part of this specification, in which—

Figure 1:
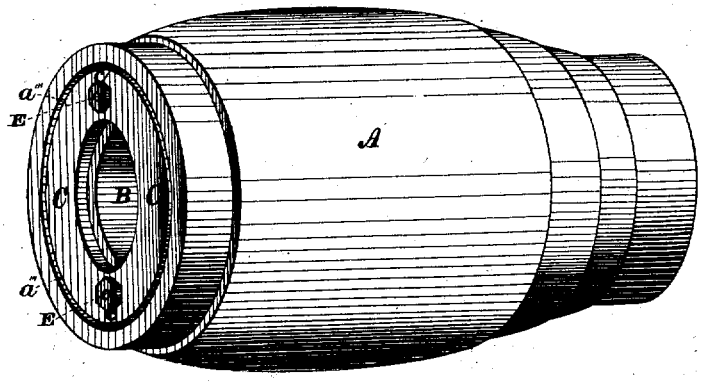
Figure 2:
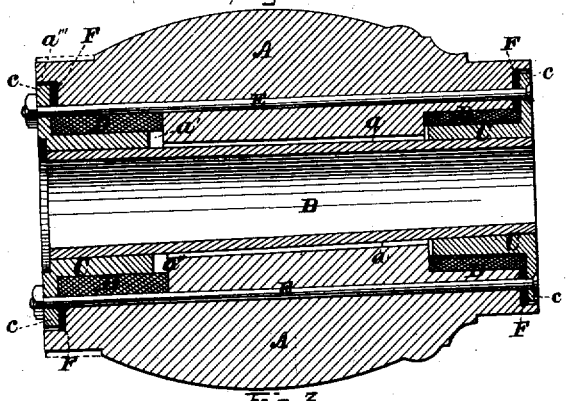
Figure 3:
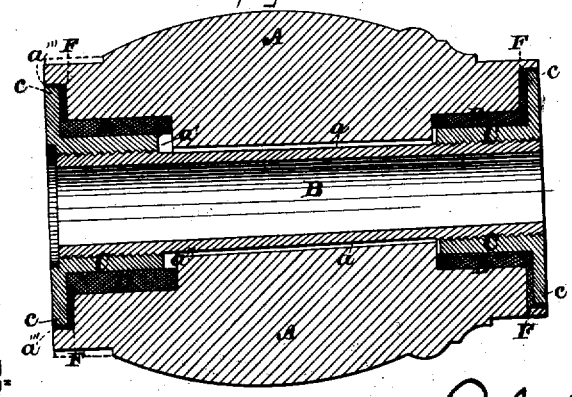

Figure 1 is a perspective view of my hub as completed for use, but detached from the wheel; and Figs. 2 and 3 are central longitudinal sections of the same, and show different methods for drawing together the compression-flanges.

Letters of like name and kind refer to like parts in each of the figures.

The design of my invention is to enable the axle-box of a carriage-wheel to be cushioned, so as thereby to lessen the jar and noise occasioned by the passage of said wheel over the inequalities of a road; to which end it consists, principally, in the means employed for confining the elastic cushions in position between the hub and axle-box, and for expanding said cushions radially by longitudinal compression, substantially as and for the purpose hereinafter specified.

It consists, further, in the means employed for lessening the friction between the compression-collars and elastic packing, substantially as and for the purpose hereinafter shown.

In the annexed drawing, A represents a wooden hub, of usual form, which is provided with an axial opening, *a*, for the reception of a metal box, B, and at each end of such opening has an enlargement or recess, *a'*, that extends inward about one-fourth the length of said hub, and has such diameter as to form at its inner end a shoulder, *a''*, which has radially about one-half an inch of width.

Passing through the axial opening *a* in the hub A is a metal box, B, which has considerably less diameter than said opening, and corresponds in length to the length of said hub.

Upon each end of the box B is placed a collar, C, which, at its outer end, is provided with a radial flange, *c*, that extends outward nearly to the periphery of the hub A, and, when said collar is in place upon said box, is contained within a corresponding recess, *a'''*, that is formed within the contiguous end of said hub, the outer face of said collar being flush with the surface of said hub-end.

Between the periphery of the inner cylindrical portion of the collar C and the adjacent portion of the hub A, within the recess *a'*, is left a space which has about one-fourth of an inch radial dimensions, and within such space is placed a tube or ring of elastic material, D, that, before said collar is moved inward to position, substantially fills said space, and projects outward beyond the end of the hub, but which, by the inward motion of said collar, is compressed longitudinally and caused to expand radially, until it presses upon said collar and hub with a pressure that corresponds to the degree of such longitudinal compression.

The collars are forced inward by means of bolts E, which pass through the same and through the hub A, as shown in Fig. 2; or they may be threaded interiorily, and fitted upon the exteriorly-threaded periphery of the box B, as shown in Fig. 3, and forced inward by rotation, as in case of an ordinary nut; but in either case the result will be the longitudinal compression and radial expansion of the elastic tubes or rings D.

The elastic bearings between the hub A and box B operate as cushions, and lessen, if they do not entirely prevent, the transmission to said box of shocks received by the wheel, a sufficient amount of relative motion being allowed to said parts by the enlargement of the central portion of the axial opening *a* and by making the recesses *a'''* somewhat larger than the flanges *c* of the collars C.

In order that the yielding motion of the hub A and box B may take place with more freedom, I interpose between the flange *c* of each collar C and the adjacent end of said hub an elastic washer, F, which not only facilitates the relative radial movement of said hub and box, but also cushions them against jars caused by the end thrust of the wheel.

Another advantage obtained by the use of the elastic washers F is the exclusion of dirt and oil from the elastic bearings D, which bearings, if constructed from rubber, would be injured, and eventually ruined, by the presence of oil.

While the flanges *c* of the collar C are preferably smaller than the ends of the hub, and are let into recesses within said ends, they may each be caused to extend over the entire end of said hub and horizontally around the adjacent portion of its periphery, as shown by the dotted lines of Fig. 3, in which event an elastic ring may be interposed between the said extended horizontal portion of said collar and the periphery of said hub, for the purpose of affording an additional cushion or elastic bearing for the box.

To prevent adhesion of the rubber to the collar, thin sheet metal may be interposed between their contiguous surfaces.

Having thus fully set forth the nature and merits of my invention, what I claim as new is—

1. In combination with the hub A, the metal box B, and the elastic tubes or rings D, which surround the ends of said box within the recesses *a'* of said hub, the collars C fitted within said tubes over the ends of said box, and provided with radial flanges *c*, that extend outward over the ends of said tubes and over the ends of said hub, and each capable of an independent inward motion over said box, so as to cause said tubes to be compressed longitudinally and expanded radially within their said recesses, substantially as and for the purpose specified.

2. In combination with the compression-collars C and elastic packing D, sheet metal interposed between said parts, substantially as and for the purpose shown.

In testimony that I claim the foregoing I have hereunto set my hand this 10th day of January, 1878.

JOHN RADDIN.

Witnesses:
GEO. S. PRINDLE,
HENRY C. HAZARD.